US012383908B2

(12) United States Patent
Johansson et al.

(10) Patent No.: US 12,383,908 B2
(45) Date of Patent: Aug. 12, 2025

(54) GYRATORY CRUSHER SPIDER BUSHING

(71) Applicant: SANDVIK SRP AB, Svedala (SE)

(72) Inventors: Jan Johansson, Svedala (SE); Johan Gunnarsson, Svedala (SE)

(73) Assignee: Sandvik SRP AB, Svedala (SE)

( * ) Notice: Subject to any disclaimer, the term of this patent is extended or adjusted under 35 U.S.C. 154(b) by 308 days.

(21) Appl. No.: 18/029,741

(22) PCT Filed: Oct. 1, 2020

(86) PCT No.: PCT/EP2020/077467
§ 371 (c)(1),
(2) Date: Mar. 31, 2023

(87) PCT Pub. No.: WO2022/069044
PCT Pub. Date: Apr. 7, 2022

(65) Prior Publication Data

US 2023/0372946 A1 Nov. 23, 2023

(51) Int. Cl.
*B02C 2/06* (2006.01)

(52) U.S. Cl.
CPC .................................... *B02C 2/06* (2013.01)

(58) Field of Classification Search
CPC .............. B02C 2/06; B02C 2/04; B02C 2/045
USPC ................................................ 241/209, 211
See application file for complete search history.

(56) References Cited

U.S. PATENT DOCUMENTS 3,813,047 A * 5/1974 Torrence .................. B02C 2/06
241/211

FOREIGN PATENT DOCUMENTS

EP 2873461 A1 5/2015
EP 2873461 B1 * 4/2017 .............. B02C 2/02
EP 3131677 B1 11/2019

* cited by examiner

*Primary Examiner* — Bobby Yeonjin Kim
(74) *Attorney, Agent, or Firm* — Corinne R. Gorski

(57) ABSTRACT

A gyratory crusher spider bushing positions radially intermediate thereof a topshell spider and a crusher main shaft configured for gyroscopic precession within a crusher. The bushing includes a cylindrical main body having an inside surface and an outside surface centered around a longitudinal axis. A collar is arranged in connection to the top end of the bushing. The inside surface includes a fulcrum point having the smallest diameter of the bushing. An angle (α) defines the inside surface inclination above/below the fulcrum point in relation to the longitudinal axis. An inside length of the body is defined from the fulcrum point to the top end of the collar. A plurality of longitudinal cutouts are located at the inside of the body and are partly recessed in the inside surface. The cutouts have a length of which the lowermost part is located at or above the region of the fulcrum point.

11 Claims, 3 Drawing Sheets

GYRATORY CRUSHER SPIDER BUSHING

RELATED APPLICATION DATA

This application is a § 371 National Stage Application of PCT International Application No. PCT/EP2020/077467 filed Oct. 1, 2020.

FIELD OF INVENTION

The present invention relates to a gyratory crusher spider bushing for positioning radially intermediate a topshell spider and a crusher main shaft. Further the present invention relates to a gyratory crusher.

BACKGROUND

Cone crushers are used for crushing ore, mineral and rock material to smaller sizes. A gyratory crusher is an example of a cone crusher. Typically, the crusher comprises a crushing head mounted upon an elongate main shaft. A first crushing shell is mounted on the crushing head and a second crushing shell is mounted on a frame such that the first and second crushing shells define together a crushing gap through which the material to be crushed is passed. A driving device is arranged to rotate an eccentric assembly about the lower portion of the shaft, so as to cause the crushing head to perform a gyratory pendulum movement and to crush the material introduced in the crushing gap.

EP 3 131 677 discloses an exemplary cone crusher. The crusher has an upper shaft bearing in which a crusher shaft is rotatably mounted. The head of the crusher shaft 2 carries out a tumbling movement in the upper shaft bearing and is rolling against an annular wear insert 3 held in the upper shaft bearing. The wear insert 3 is held in a rolling bush 4. The wall of the rolling bush 4 is radially breached by a plurality of slots 11 which extend in the axial direction along the wall. The slots extend from the flange 10 over the entire length of the wear insert inserted in the rolling bush. The slots 11 open out in the lower edge 12 of the rolling bush 4. So, the rolling bush of this crusher has slots going through the entire wall in radial direction in order to assist the clamping reduction in diameter of the rolling bush.

In cone crushers the gyratory pendulum movement of the crushing head is supported by a top bearing into which an upper end of the main shaft is journaled, and lower slide bearings positioned below the crushing head into which a lower end of the main shaft is journaled. In connection to the top bearing there is provided a spider bushing. Under the gyratory pendulum movement of the crushing head the bushing is subject to wear. The magnitude of the wear is so that the bushing might needs changing due to having been worn down as often as the mantel is changed or every second time the mantle is changed.

There is a need to improve the wear resistance of the spider bushing.

Thus, what is required is a bushing for a gyratory crusher and a gyratory crusher that addresses the above problems.

SUMMARY

It is an object of the present invention to provide a spider bushing with appropriate wear resistance.

The objectives are achieved by a spider bushing having appropriate means to better distribute the grease that slows down the wear rate. The distribution of grease should be focused on where the wear is most significant. A secondary objective is to provide a bushing having wear indicator means.

According to a first aspect of the present invention there is provided a gyratory crusher spider bushing for positioning radially intermediate a topshell spider and a crusher main shaft configured for gyroscopic precession within a crusher. The bushing comprising a cylindrical main body with an inside surface and an outside surface centered around mainly vertically orientated longitudinal axis; a collar arranged in connection to the top end of the gyratory crusher spider bushing; the inside surface comprising a fulcrum point having the smallest diameter of the gyratory crusher spider bushing, wherein an angle defines the inside surface inclination above/below the fulcrum point in relation to the longitudinal axis, and wherein an inside length is defined from the fulcrum point to the top end of the collar; a plurality of longitudinal cutouts located at the inside of the annular body, wherein the cutouts are partly recessed in the inside surface; and wherein the cutouts have a length of which the lowermost part is located at or above the region of the fulcrum point. This is advantageous since in the region of the fulcrum point at the lower part of the bushing is where the wear is most significant.

Preferably, the cutouts of the bushing are mainly parallel with the axis. This gives an even distribution of the grease.

Preferably, the number of cutouts is at least three. The number could also be larger, such as four, six, eight, 10, 12 or 16. The longitudinal cutouts can also be defined as channels, slots or recesses. The have preferably a rounded shape, such as half a cylinder or half an oval, but could also be of a shape with a sharp edge. The cutouts can be evenly distributed around the inside surface, but can also be unevenly distributed. The number of cutouts should be sufficient in order to insure sufficient greasing. The number is partly dependent on the size of the bushing, a larger bushing might require a larger number of cutouts.

Optionally, the lowermost point of the cutout length is above the fulcrum point. The fulcrum point is an area of the bushing that is subject to a lot of wear. Thus, there is a need to focus greasing in this area. By ending the cutouts above the fulcrum point grease is further distributed by gravity.

Preferably, the lowermost point of the cutout length may be located on 10% of the inside length from the lowermost point of the inside length. This gives a well defined direction for the greasing medium.

Optionally, the uppermost point of the cutout length is located on 20% of the inside length from the uppermost point of the inside length.

Alternatively, the cutout length equals the inside length.

Preferably, the inside surface comprises a chamfered point above which an angle defines the inclination of the inside surface in comparison to the longitudinal axis. This helps to slow down the wear rate.

The chamfered angle is preferably larger than the fulcrum angle. The chamfered angle can have the double size of the fulcrum angle.

Optionally, the chamfered point is located on 30% of the inside length from the uppermost point of the inside length.

According to a second aspect of the present invention there is provided a gyratory crusher comprising a bushing.

BRIEF DESCRIPTION OF DRAWINGS

A specific implementation of the present invention will now be described by way example only and with reference to the following drawings in which.

DETAILED DESCRIPTION

Figure 1:
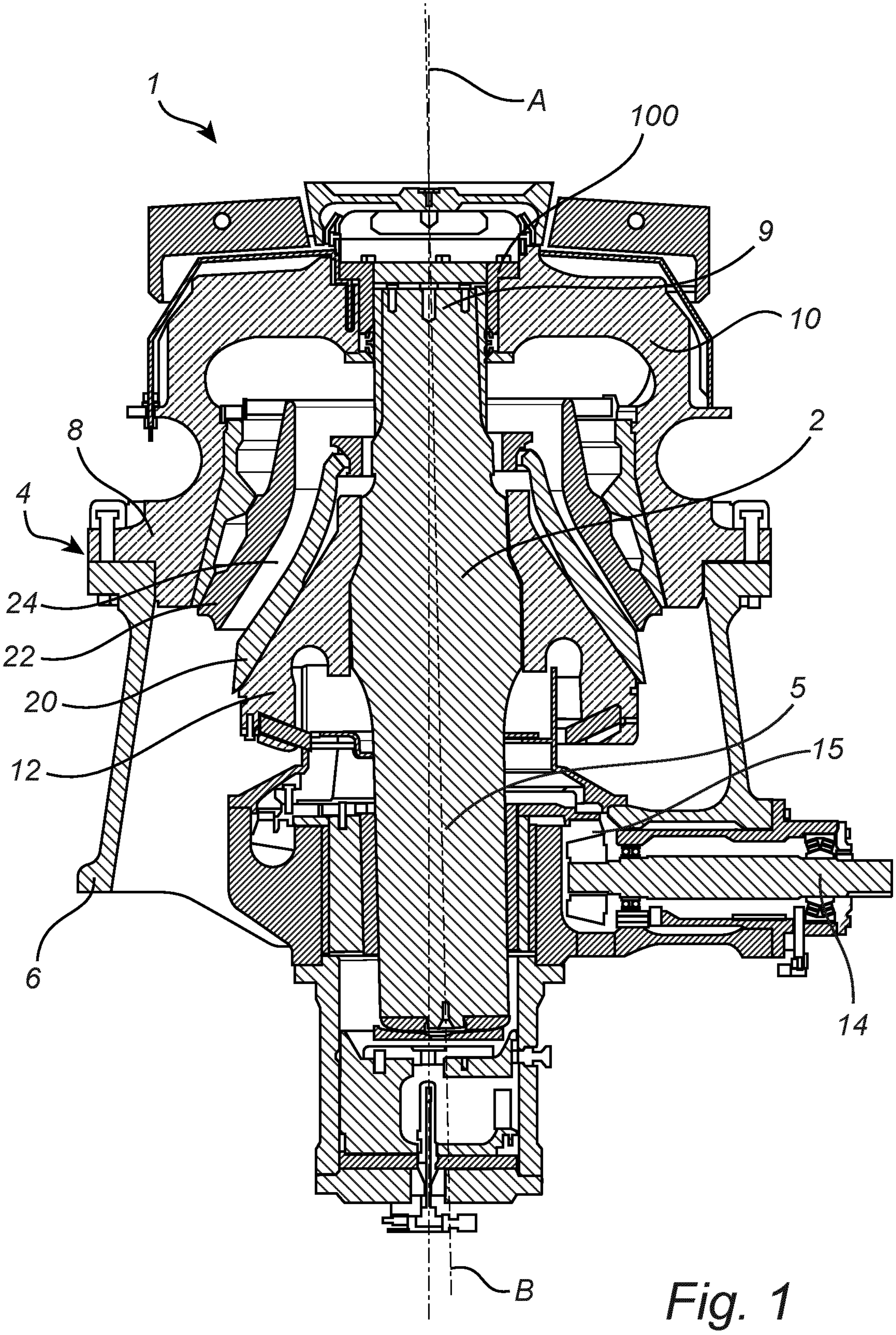
FIG. 1 is a cross-sectional side view of a gyratory crusher having a main shaft supported at its upper end by a top bearing.

FIG. 1 discloses a cone crusher 1 having a vertical crushing head shaft 2 and a frame 4 with a bottom part 6 and a top part 8. A crushing head 12 is mounted upon an elongate shaft 2 having longitudinal axis B. A first (inner) crushing shell 20 is fixably mounted on crushing head 12 and a second (outer) crushing shell 22 is fixably mounted at upper frame 8. A crushing zone 24 is formed between the opposed crushing shells 20, 22. A discharge zone is positioned immediately below crushing zone 24 and is defined, in part, by lower frame 6. When the crusher 1 operates material is crushed between the inner crushing shell 20 and the outer crushing shell 22. This is the result of the gyrating movement of the crushing head 12, during which movement the two crushing shells approach one another along a rotating generatrix and move away from one another along a diametrically opposed generatrix.

A drive (not shown) is coupled to main shaft 2 via a drive shaft 14 and suitable gearing 15 so as to rotate shaft 2 eccentrically about a longitudinal axis A of the crusher and to cause head 12 and mantle 20 to perform a gyratory pendulum movement and crush material introduced into crushing zone 24. Accordingly the longitudinal axis B of main shaft 2 oscillates about crusher longitudinal axis A. An upper end region 9 of shaft 2 is maintained in an axially rotatable position by a top-end bearing assembly and a spider bushing 100 positioned intermediate between main shaft region 9 and a spider assembly 10 positioned about axis A. Similarly, a bottom end region of shaft 2 is supported by a bottom-end bearing assembly.

Upper frame 8 comprises a topshell, mounted upon lower frame 6 (alternatively termed a bottom shell), and the spider assembly 10 that extends from topshell and represents an upper portion of the crusher.

Figure 2:
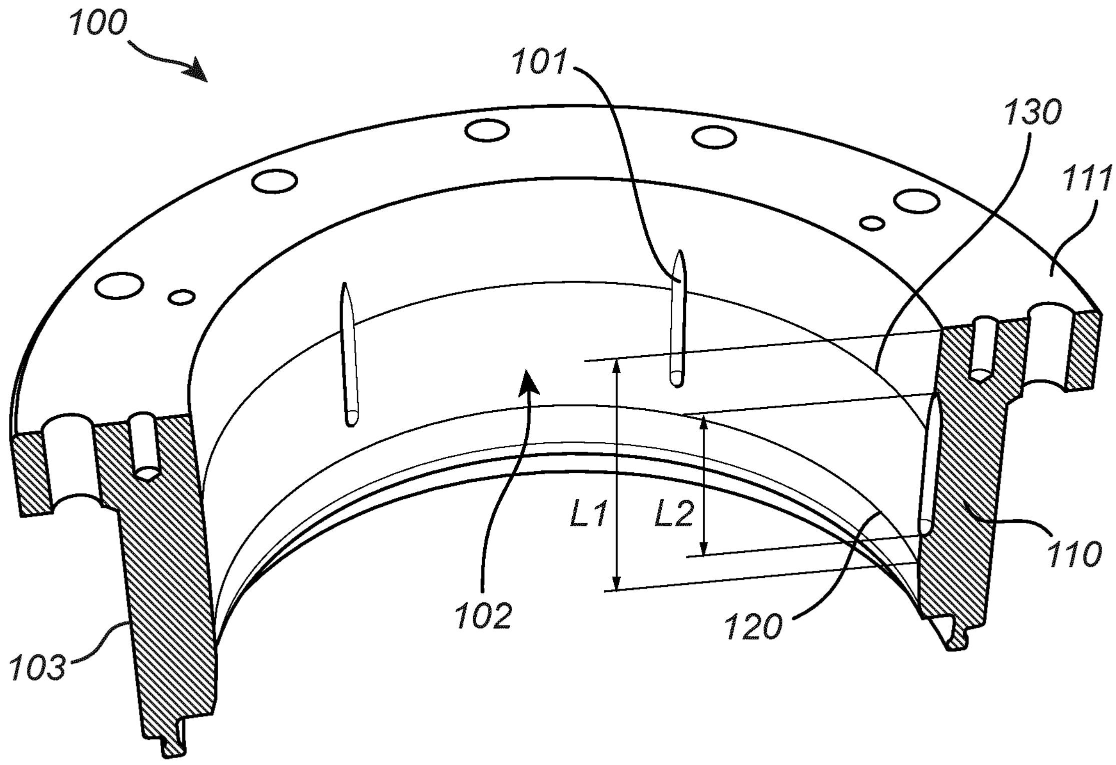
FIG. 2 is a perspective view of the bushing shown in FIG. 1 according to a first embodiment.
Figure 3:
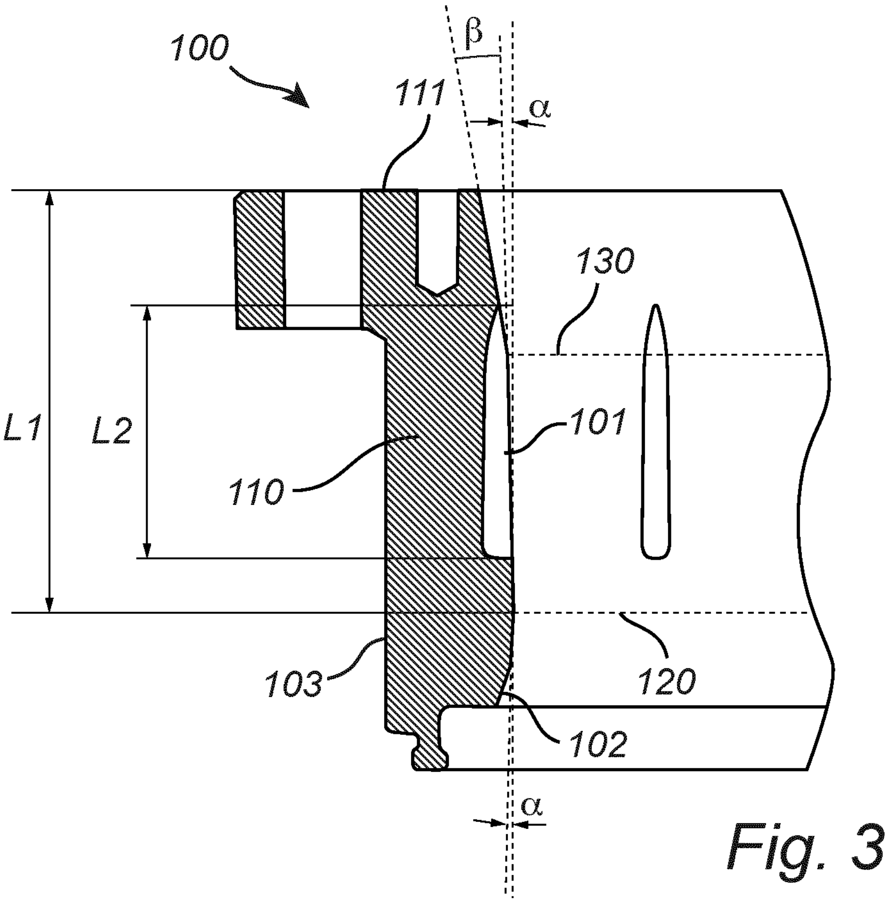
FIG. 3 is a magnified cross-sectional side view of the bushing shown in FIG. 1 according to a first embodiment.

The spider bushing 100 comprises a generally annular sleeve-like body 110 that extends around axis A, which is orientated mainly vertically. A first embodiment is disclosed in FIGS. 2 and 3. The cylindrical body 110 has an inside surface 102 and an outside surface 103. The bushing 100 has an upper end defined as a collar 111 being perpendicular to the body 110 so it is extending radially outward from the bushing. A plurality of boreholes extend axially through the collar 111. There are specific boreholes for anchorage bolts to rotatably lock bushing 100 relative to axis A and spider assembly 10. Other boreholes are specifically dimensioned for lubrication oil or the like to the region between the bushing 100 and the shaft 2.

The inside surface 102 of the bushing may have different diameters with smooth transitions between the different diameters. A fulcrum point 120 represents the area with the smallest diameter. This point is normally located on the lower part, such as a fifth from the bottom of the full height or length of the inside surface. The fulcrum point 120 could also be located 15% to 25% from the lower end of the full height of the inside surface. The second smallest diameter of the inside of the bushing is defined as a chamfered point 130. The inside of the bushing has it's largest diameter at the top end.

On the inside surface 102 of the bushing longitudinal cutouts 101 are arranged in mainly the axial direction. The cutout is a recess or groove, meaning that it is a relatively shallow indent of the surface. The recess could have any shape, such as round, oval, v-shaped, or any other shape. It serves the purpose of improving lubrication in order to spread the oil or lubrication media appropriately to reduce wear of the bushing. The oil is to be distributed on the inside surface 102 especially in the area of the fulcrum point 120, which is the area subject to a lot of wear. The cutouts could also serve a second purpose, namely of being wear indicators. In that case the dimension of the cutouts is chosen so that when the bushing is worn to such an extent that the cutouts no longer are visible, meaning that the bushing needs to be replaced or to be repaired.

The depth of the cutout 101 in the inside surface is typically only a few millimetres, representing less that 1% of the wall thickness of the bushing. Typically the upper end is more pointed than the lower end that is more rounded.

The axial length of the inside surface 102 of the bushing 100 is defined as L1 from the fulcrum point 120 to the upper side of the bushing (collar 111). The axial length of the cutout 101 is defined as L2.

The length of the cutouts 101 and the number of them might vary. As in FIG. 2 the number of cutouts is 6, wherein the cutouts are evenly distributed around the inside perimeter of the bushing. The cutouts could also have an uneven distribution around the inside surface. The length L2 of the cutouts 101 in this first embodiment is somewhat longer than half the inside axial length of the bushing L1. The cutout length L2 thus, has a lower end a short distance above the fulcrum point 120 and its upper end is located a short distance above the chamfered point 130. The cutout length L2 is about 60% of the inside axial length of the bushing L1. L2 could also be 55%, 65%, 70% or 75% of L1.

Figure 4:
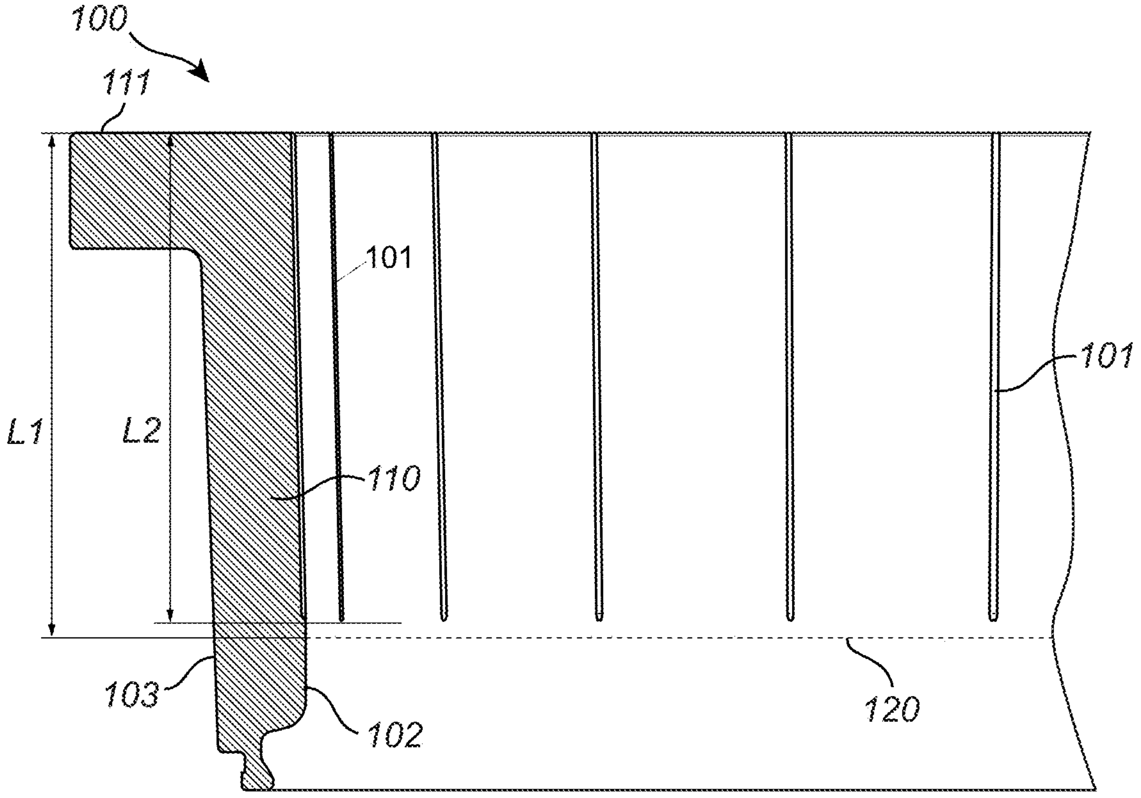
FIG. 4 is a magnified cross-sectional side view of the bushing shown in FIG. 1 according to a further embodiment.
Figure 5:
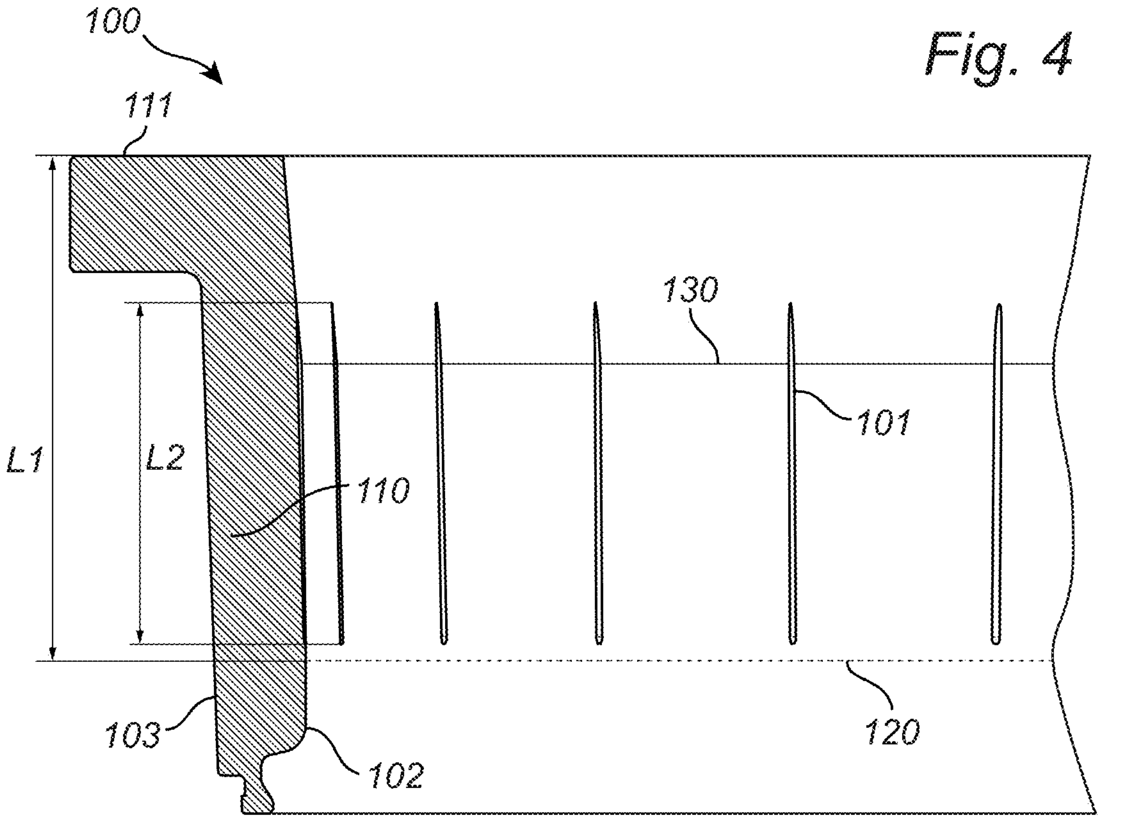
FIG. 5 is a magnified cross-sectional side view of the bushing shown in FIG. 1 according to a further embodiment.

In FIGS. 4 and 5 a second and third embodiment of a spider bushing 100 are shown, respectively. The second embodiment has a number of cutouts 101 having the length L2 nearly equal the inside axial length of the bushing L1, ending shortly above the fulcrum point 120. The embodiment in FIG. 4 discloses the fulcrum point 120 having the smallest diameter. From the fulcrum point 120 the angle $\alpha$ defines a straight line up to the upper end of the bushing.

The third embodiment in FIG. 5 discloses both the fulcrum point 120 and the chamfered point 130. The cutouts 101 have the length L2 representing about 70% to 80% of the inside axial length of the bushing L1. The chamfered point 130 might be located 30% down from the uppermost point of the inside length of the bushing L1. The chamfered point 130 might also be located higher up, such as on 20% or 25% of the inside length L1, or further down, such as 35% or 40% of the inside length of the bushing L1.

The number of cutouts in the second and third embodiment is higher then in the first embodiment, so that the spacing on the perimeter between the cutouts is closer than in the first embodiment. In FIGS. 4 and 5 the distribution of the cutouts around the diameter is relatively evenly distributed but could also have a more uneven distribution. The number of cutouts is 20, but could also be smaller such as 8, 10, 12 or 16. Or the number could be larger than 20, such as 24, 28 or 30. The number of cutouts is partly correlated to the size of the bushing, so that a larger bushing normally requires a larger number of cutouts.

The lowermost point of the cutouts 101 is at the fulcrum point or shortly above. Shortly above being defined as a few percentages of the inside axial length of the bushing L1. The upper end of the cutouts could be the same as the upper end of the inside axial length of the bushing L1. Depending on the embodiment the cutout length L2 may vary, but it can never go below the fulcrum point 120.

The invention claimed is:

1. A gyratory crusher spider bushing arranged for positioning radially intermediate a topshell spider and a crusher main shaft configured for gyroscopic precession within a crusher, the bushing comprising:

- a cylindrical main body with an inside surface and an outside surface centered around a mainly vertically orientated longitudinal axis;
- a collar arranged in connection to a top end of the gyratory crusher spider bushing, wherein the inside surface includes a fulcrum point having a smallest diameter of the gyratory crusher spider bushing, wherein a fulcrum angle defines an inside surface inclination above/below the fulcrum point in relation to the longitudinal axis, and wherein an inside length is defined from the fulcrum point to a top end of the collar; and
- a plurality of longitudinal cutouts located at the inside of the main body, wherein the cutouts are partly recessed in the inside surface, and wherein the cutouts have a length of which a lowermost part is located at or above a region of the fulcrum point.

2. The bushing as claimed in claim 1, wherein the cutouts are mainly parallel with the longitudinal axis.

3. The bushing as claimed in claim 1, wherein the plurality of cutouts include at least three cutouts.

4. The bushing as claimed in claim 1, wherein the lowermost point of the cutout length is above the fulcrum point.

5. The bushing as claimed in claim 4, wherein the lowermost point of the cutout length is located on 10% of the inside length of the body from a lowermost point of the inside length.

6. The bushing as claimed in claim 1, wherein an uppermost point of the cutout length is located on 20% of the inside length of the body from an uppermost point of the inside length.

7. The bushing as claimed in claim 1, wherein the cutout length equals the inside length of the body.

8. The bushing as claimed in claim 1, wherein the inside surface of the body includes a chamfered point above which a chamfered angle defines the inclination of the inside surface in comparison to the longitudinal axis.

9. The bushing as claimed in claim 8, wherein the chamfered angle is larger than the fulcrum angle.

10. The bushing as claimed in claim 8, wherein the chamfered point is located on 30% of the inside length from an uppermost point.

11. A gyratory crusher comprising a bushing as claimed in claim 1.

* * * * *